F. BANGERTER.
WATER METER.
APPLICATION FILED JULY 10, 1909.

1,049,329.

Patented Jan. 7, 1913.

3 SHEETS—SHEET 1.

WITNESSES:
Fred Wlik
René Bruine

INVENTOR
Fred Bangerter,
By Attorneys
Arthur C Fraser Usina

F. BANGERTER.
WATER METER.
APPLICATION FILED JULY 10, 1909.
1,049,329.
Patented Jan. 7, 1913.
3 SHEETS—SHEET 2.
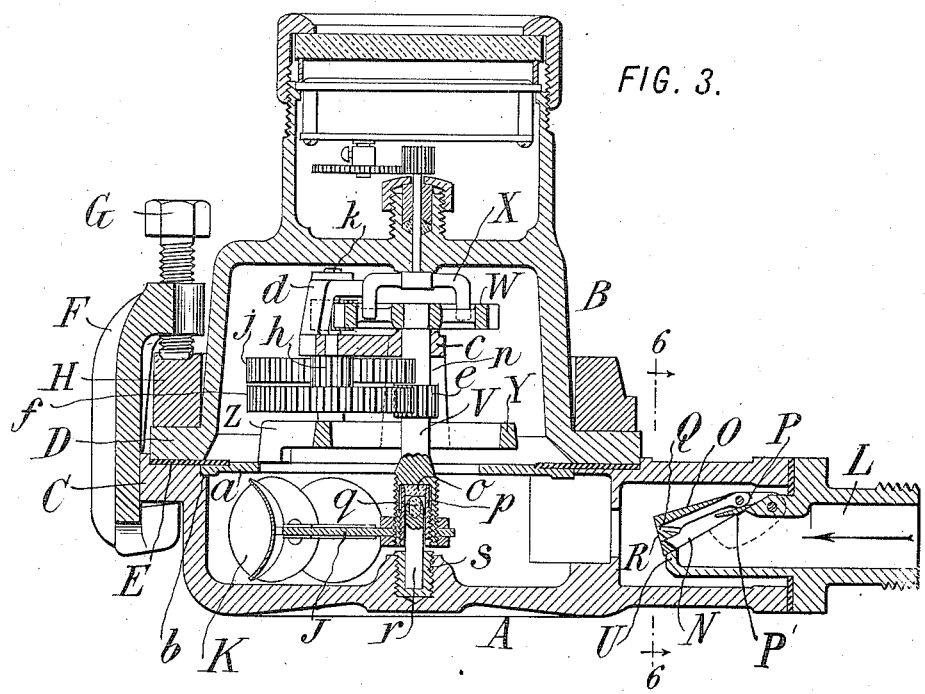
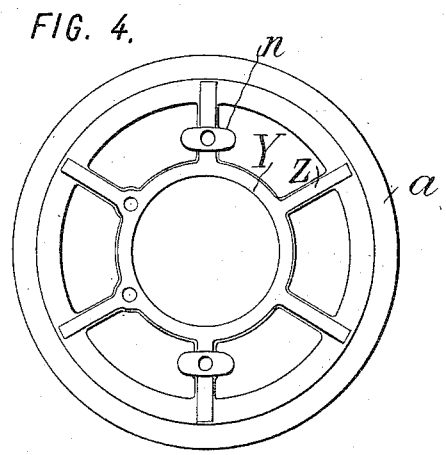
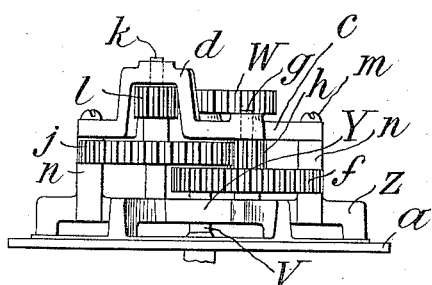
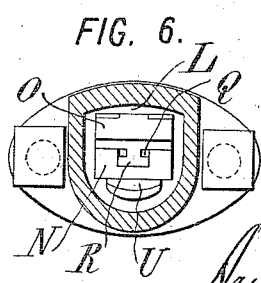
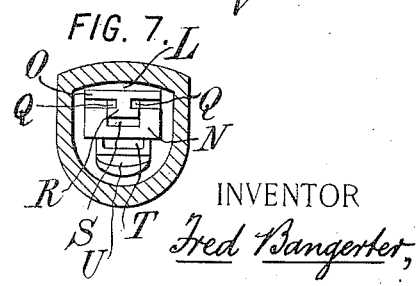
WITNESSES:
Fred White
René Bruine
INVENTOR
Fred Bangerter,
By Attorneys,
Arthur C. Fraser & Usina

F. BANGERTER.
WATER METER.
APPLICATION FILED JULY 10, 1909

1,049,329.

Patented Jan. 7, 1913.

3 SHEETS—SHEET 3.

WITNESSES:
Fred White
René Bruine

INVENTOR:
Fred Bangerter,
By Attorneys,
Fraser Tinkt Myers

UNITED STATES PATENT OFFICE.

FRED BANGERTER, OF NEW YORK, N. Y., ASSIGNOR TO THE STANDARD WATER METER COMPANY, OF BROOKLYN, NEW YORK, A CORPORATION OF NEW YORK.

WATER-METER.

1,049,329.

Specification of Letters Patent.

Patented Jan. 7, 1913.

Application filed July 10, 1909. Serial No. 506,966.

*To all whom it may concern:*

Be it known that I, FRED BANGERTER, a citizen of the Swiss Republic, residing in the borough of Brooklyn, county of Kings, city and State of New York, have invented certain new and useful Improvements in Water-Meters, of which the following is a specification.

This invention aims to provide certain improvements in water meters especially, though not exclusively, adapted to meters of the type in which a water wheel is set in rotation by the current flowing through the meter.

An important feature of the invention consists in providing a two-part casing inclosing a water chamber and using means for holding the two parts of the casing together against the internal water pressure, which holding means are weaker than the parts of the casing, so as to yield before the casing yields in case of freezing, and thus prevent breakage of the more expensive casing.

Another feature of importance lies in the provision of an inlet nozzle so designed as to provide orifices of different sizes in accordance with the flow, or to provide orifices which introduce the water in different directions respectively, or to provide for changes both in the size of the orifices and in the direction of the flow.

The accompanying drawings illustrate an embodiment of the invention.

Figure 1:
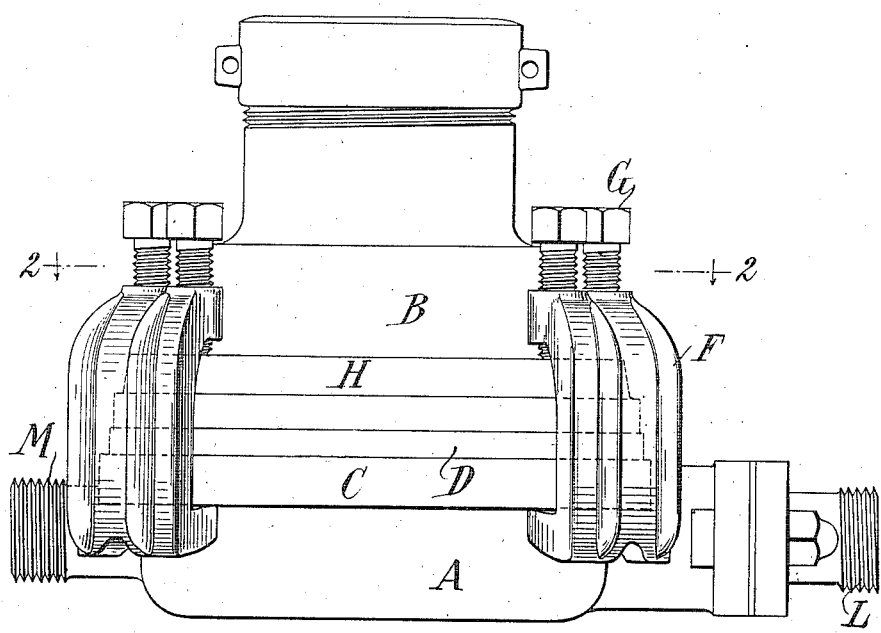
Figure 2:
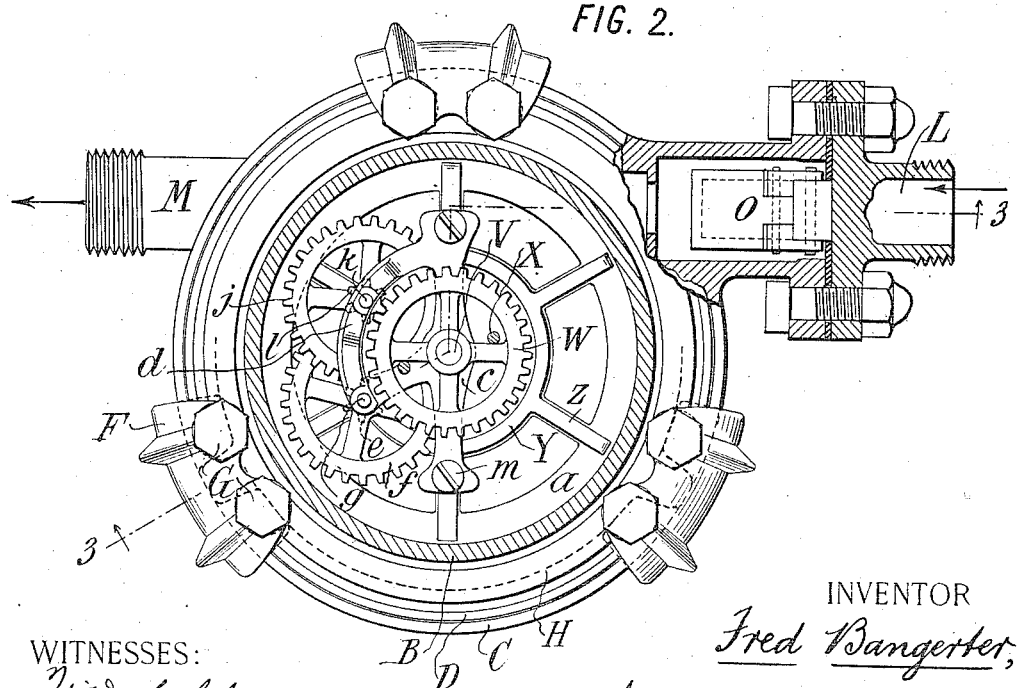
Figure 10:
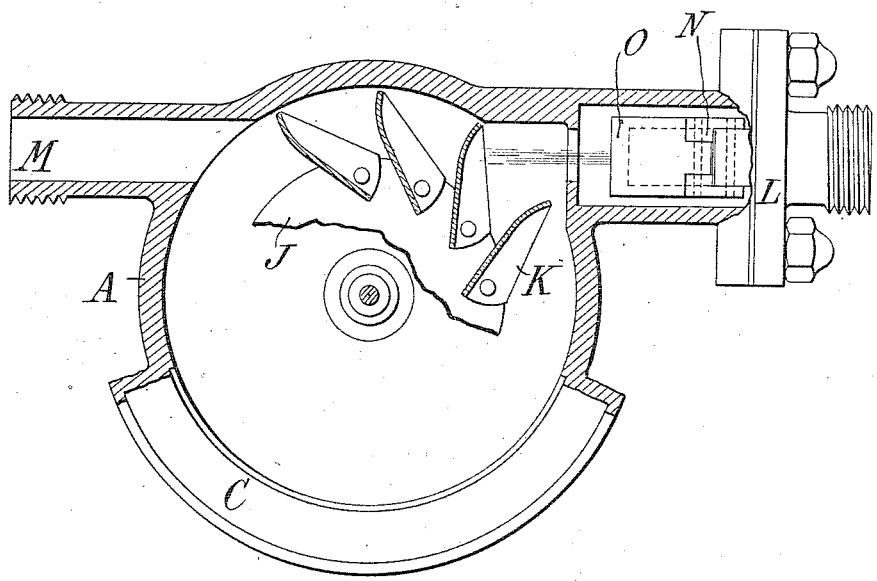
Figure 8:
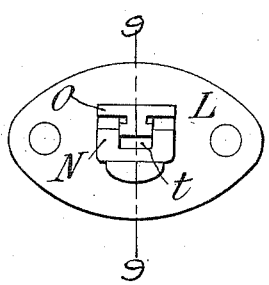
Figure 9:
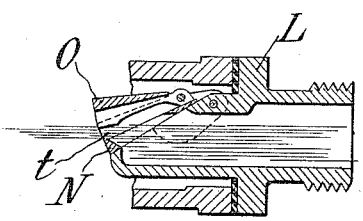

Figure 1 is a side elevation of the meter. Fig. 2 is a plan with the central chamber and the inlet nozzle in section, on the line 2—2, Fig. 1. Fig. 3 is a vertical section through the center and the inlet nozzle, approximately on the line 3—3 of Fig. 2. Fig. 4 is a plan of the lower part of the supporting frame for the gearing. Fig. 5 is a side elevation of the gearing. Fig. 6 is a transverse vertical section of the inlet pipe just beyond the nozzle, as indicated by the line 6—6 of Fig. 3. Fig. 7 is a view similar to Fig. 6 with the parts in a different position. Fig. 8 is a front end view of the nozzle, showing the upper lip raised and the lower lip down. Fig. 9 is a transverse section of the nozzle on the line 9—9, Fig. 8. Fig. 10 is a top plan view partly in section of the meter with the upper part of the casing removed, showing the direction and action of the jet from the nozzle with the upper lip raised.

Referring now to the embodiments of the invention illustrated, the casing is formed in two parts, a lower part A and an upper part B, preferably of brass or other non-corrodible material, these parts being provided with outward flanges C and D respectively along their meeting edges by means of which the chamber is closed. The flange C is made slightly wider and is recessed so that the flange D fits into it and compacts more evenly the packing ring E of paper, rubber or the like, which lies in the recess in the face of the flange C.

The flanges are clamped together by means of three separate, comparatively small clamps F which may be of cheaper corrodible metal, such as cast iron or steel, and which extend around the outer edges of the flanges and overhang the same, and are provided at their upper ends with bolts G for clamping the two flanges together. The flanged joint is preferably reinforced by means of a separate ring H of cast iron or steel fitting against the flange D and into a groove of which enter the lower ends of the bolts G. These cast iron or steel clamps and ring are more springlike than brass, and are harder, so that the bolts G can be moved down more firmly and with less friction than would be the case on comparatively soft brass. The rings H will generally be made with their under faces minutely higher at the points where the clamps are located than at the intermediate points so as to make a good fit all around when pressed down by the clamping bolts. The separate ring H, however, may be omitted, the thickness necessary for stiffness being provided in the flanges C and D themselves.

The clamps F, although preferably of material which is harder than the casing, are so constituted and proportioned as to be weaker than the parts of the casing so as to yield before the casing in case of freezing; though they are strong enough to hold the two parts of the casing together and maintain a watertight joint against the internal water pressure. In case of freezing they will burst or crack before any injurious strain is brought upon the other parts of the apparatus and being of a cheap material and not necessarily finely finished, they can be replaced for a few cents. Water meters are often required to stand a test of 150 to 200 pounds pressure per square inch, and under such circumstances the cast iron clamps would be designed to crack or break at 300 or more pounds pressure per square inch.

The water wheel comprises a disk J with buckets K rotating in the lower part of the chamber and actuated by a tangential flow from the inlet nozzle L (see Fig. 10), the water passing out through the outlet M. The inlet nozzle is provided with a pair of lips N and O pivoted at their rear ends, the lip N being the heavier and being pivoted to a part of the casing, while the lip O is lighter and is pivoted upon the heavier lip N. The upward movement of the lighter lip O is limited by an extension P at its rear end which strikes an adjacent stop P' carried on the heavier lip. The jet issuing from the nozzle when the upper lip is lifted, issues from between the side-walls or cheeks of a passage t formed in the lower lip, within which passage the upper lip is adapted to project, so that the water passing therethrough is confined laterally and the particles in motion are given a common direction. The upper lip being pivotally mounted may rise and fall in the passage so as to conform the size of the opening or orifice to the volume of water passing. The water therefore issues from the nozzle in a compact stream or jet in a direction to strike the tangential buckets of the water wheel, which assures that the stream of water shall have sufficient force and concentration to reach and strike the water wheel and actuate the meter.

The form and direction of the stream issuing from the passage in the lower lip, the upper lip being lifted, is clearly illustrated in Fig. 10 of the drawing. The nozzle with the upper lip lifted and the stream issuing from the passage in the lower lip, is also illustrated in Figs. 8 and 9, Fig. 8 being a front end view and Fig. 9 a longitudinal section of the nozzle. These lips constitute yielding members, the lighter one of which is adapted to yield with comparatively slight flow without the lifting of the heavier lip; while a sufficiently strong flow will lift the heavier lip and the lighter lip at the same time. When there is not enough flow of water to lift either of the lips N and O, there is provided a minimum orifice or pair of orifices Q formed by grooves cut in the sides of a tongue R on the lower side of the lip O. When there is a sufficient flow of water to lift the lighter lip O there is provided in addition to the orifice or orifices Q, an additional orifice S, (Fig. 7) below the tongue R. When a still greater flow of water is called for the heavier lip N is lifted to provide an additional orifice T between said lip and the fixed lip U at the front of the nozzle. By this provision of a plurality of lips, adapted respectively to yield to flows of different volumes of water, and adapted in yielding to provide orifices of different sizes, the meter can be so designed as to register the amount of water accurately and to avoid the discrepancy which would be produced by the varying velocities of the jet directed upon the water wheel from the nozzle if the nozzle orifice were always the same. I use the term "orifice" here to indicate the total cross-section of the space or of the plurality of spaces through which the water issues, so as to include in one case the two openings Q, in another case these two openings and an additional opening S, and in another case the openings Q, S and T.

In order to further alter the effect of the jet upon the water wheel, one of the orifices may be inclined so as to introduce the water in a different direction, intersecting that of another orifice, so that by closing or opening one of said orifices, preferably opening or closing the other concurrently, the flow may be produced at one or another desired angle. For example, each orifice Q near its outlet end is upwardly inclined so that for a minimum flow, where the lighter lip O is not lifted, the jet of water is not only a very fine one, but is inclined so as not to strike the water wheel at the most effective angle. The inner or rear portion of the orifice Q may be forked as shown in Fig. 3 so as to provide a wide entrance for the water. For example with a meter for a five-eighths inch pipe and with a nozzle of the proportions illustrated, and with the outlet from the meter wide open so as to permit a full flow, both the lips will be lifted to the limits of their movement. If the demand at the outlet pipe is only equivalent to a stream or an orifice of a diameter varying from about five-eighths to one-eighth of an inch, both lips will also be lifted, but the heavier somewhat less than its full opening and to an extent varying according to the demand. For a demand equal to a jet or orifice of one-eighth of an inch in diameter, the upper lip only will be lifted. And for a demand of one-sixteenth of an inch, both the lips will be dropped and the supply coming from the very fine orifices Q will turn the wheel at approximately the proper rate,—a result which it has been difficult or impossible to obtain with meters of this type heretofore.

The water wheel is mounted on the lower end of a shaft V and through a suitable intermediate gearing rotates a gear W which drives a fork X on the lower end of the shaft of the register. The support for the gear train comprises a ring Y which is connected by legs Z to a base ring a which rests upon a shoulder b near the upper edge of the lower portion of the casing, and fits in a circular socket in said lower portion of the casing so as to be held firmly in place by the overhanging upper portion B of the casing. The shaft V passes through the center of the ring Y and has its upper end supported in a bridge, a portion c of which overlies the space within the ring; while a portion d of the same bridge overlies a portion of the ring Y and supports the upper ends of the shafts of the gear train, the lower ends of the same shafts being supported in the ring Y. The gear train comprises a pinion e on the shaft V which drives a gear f on a second shaft g; this shaft carrying a pinion h which engages a gear j on a third shaft k; which shaft carries a pinion l engaging the final gear W which turns loosely on the upper end of the shaft V. The portion d of the bridge which supports the upper ends of the shafts is elevated at its center to provide room for the pinion l, and the bridge is fastened to the lower part of the frame by means of screws m. The flat-topped extensions n upon which these screws are fastened are indicated in Fig. 4.

For the sake of durability I provide a jeweled bearing for the shaft, and which is designed preferably as illustrated in Fig. 3. The shaft is hollow to a point above the point of attachment of the water wheel, and in the upper end of the hollow space is a sapphire o which is easily set in place and removed, being held by a hollow member p which engages the under side of the tapered edge of the jewel, and which is screwed into the socket in the lower end of the shaft. The lower member of the bearing is another sapphire q mounted in the upper end of a pin r, to the lower end of which is attached a cap or sleeve s which screws into the base of the chamber. In case of injury to the pin r it may be unscrewed and another substituted very readily, and in case of stoppage the bearing is very easily accessible for inspection and renewal or repair. The lower end of the hollow holding member p is provided with a diametral notch so that it can be taken out and replaced by means of a screw-driver. The location of the bearing in the upper end of its socket prevents any accumulation of dirt therein and also gives a better balance to the wheel by locating the latter below its point of support.

The extending of the clamps around the flanges causes the pressure to act as a transverse bending strain on the clamps so as to break them more readily than if the strain were merely a longitudinal tension or compression.

What I claim is:—

1. A water meter having a casing inclosing the water chamber and formed in two parts with meeting flanges and clamps each of which passes integrally around the outside of the two flanges and holds them together against the internal water pressure, said clamps being weaker than the parts of the casing so as to yield before the casing yields in case of freezing.

2. A water meter having a two part casing A, B, with meeting flanges C and D, clamps F passing around the outside of the flanges, and bolts G carried by said clamps for pressing said flanges together.

3. A water meter comprising an impact wheel having buckets and a nozzle for directing the entering water against such buckets tangentially to the wheel, said nozzle having lateral cheeks to confine the issuing water, and a yielding lip movable between said cheeks, whereby to conform the area of the aperture to different volumes of flow of water, and thereby to concentrate the jet of water against the buckets irrespective of the volume flowing.

4. A water meter comprising an impact wheel having buckets, and a nozzle for directing the entering water against such buckets tangentially to the wheel, said nozzle having a single passageway therethrough, and a plurality of lips at its outlet end adapted to yield to flows of varying volumes of water.

5. A water meter comprising an impact wheel having buckets, and a nozzle for directing the entering water against such buckets tangentially to the wheel, said nozzle having a single passageway therethrough, and a plurality of lips at its outlet end adapted to yield to flows of varying volumes of water, one lip resting upon another and said lips yielding successively according to the volume of water passing through the nozzle.

6. A water meter comprising an impact wheel having buckets, and a nozzle for directing the entering water against such buckets tangentially to the wheel, said nozzle having a single passageway therethrough, and a plurality of lips at its outlet end adapted to yield to flows of varying volumes of water, one lip resting upon another, and one lip having a passageway therethrough within which another lip rests, whereby the jet of water issuing therefrom may be concentrated against said buckets.

7. A water meter comprising an impact wheel having buckets, and a nozzle for directing the entering water against such buckets tangentially to the wheel, said nozzle having a single passageway therethrough, and a plurality of gravitating lips at its outlet end adapted to yield to flows of varying volumes of water.

8. A water meter comprising an impact wheel having buckets, and a nozzle for directing the entering water against such buckets tangentially to the wheel, said nozzle having a single passageway therethrough, and a plurality of lips at its outlet end adapted to yield to flows of varying volumes of water and adapted in yielding to direct the water in intersecting directions.

9. A water meter having an inlet nozzle provided with a heavier grooved lip N and a lighter lip O adapted to yield respectively to flows of different volumes of water, and adapted in yielding to provide orifices of different sizes, the lip O having a tongue R which is guided in the groove in the lip N so that when the former is lifted an opening is left through said groove, said tongue R having a small orifice which remains open when the lip O closes down on the lip N.

10. In a water meter in combination, a rotary shaft for actuating the register of the meter, a jewel $o$ and means for holding said jewel removably in place consisting of a hollow member $p$ engaging the under side of the jewel and removably attached to the lower end of the shaft.

11. In a water meter in combination, a rotary shaft for actuating the register of the meter, a jewel $o$ and means for holding said jewel removably in place consisting of a hollow member $p$ engaging the under side of the jewel and removably attached to the lower end of the shaft, in combination with a jewel $q$ and a pin $r$ in the lower part of the casing adapted to enter said hollow member $p$, and carrying said jewel $q$ in its upper end.

In witness whereof, I have hereunto signed my name in the presence of two subscribing witnesses.

FRED BANGERTER.

Witnesses:
D. ANTHONY USINA,
FRED WHITE.